United States Patent
Ueno et al.

(10) Patent No.: US 9,599,536 B2
(45) Date of Patent: Mar. 21, 2017

(54) PUMPING LOSS CALCULATION DEVICE FOR INTERNAL COMBUSTION ENGINE

(71) Applicant: HONDA MOTOR CO., LTD., Tokyo (JP)

(72) Inventors: Masaki Ueno, Wako (JP); Kimitake Ito, Wako (JP); Yosuke Kosaka, Wako (JP); Akihiro Katsuura, Wako (JP); Yuto Katori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 295 days.

(21) Appl. No.: 14/607,414

(22) Filed: Jan. 28, 2015

(65) Prior Publication Data
US 2015/0211961 A1 Jul. 30, 2015

(30) Foreign Application Priority Data
Jan. 29, 2014 (JP) ................................. 2014-014007

(51) Int. Cl.
G01M 15/08 (2006.01)
F02D 13/02 (2006.01)
G01M 15/05 (2006.01)

(52) U.S. Cl.
CPC ......... *G01M 15/08* (2013.01); *F02D 13/0261* (2013.01); *G01M 15/05* (2013.01); *Y02T 10/18* (2013.01)

(58) Field of Classification Search
CPC ..... F02D 2200/1004; F02D 2200/1006; F02D 13/023; F02D 2200/1002; Y02T 10/18; G01M 15/08
(Continued)

(56) References Cited

U.S. PATENT DOCUMENTS 6,425,373 B1* 7/2002 Robichaux .............. F02D 37/02
                                            123/350
6,874,472 B2* 4/2005 Shimizu ................ F01L 1/3442
                                            123/406.11
(Continued)

FOREIGN PATENT DOCUMENTS

DE    198 22 484 A1    11/1998
DE    199 27 950 A1    3/2000
(Continued)

OTHER PUBLICATIONS

Japanese Office Action application No. 2014-014007 issued on Nov. 10, 2015.
(Continued)

*Primary Examiner* — Freddie Kirkland, III
(74) *Attorney, Agent, or Firm* — Squire Patton Boggs (US) LLP

(57) ABSTRACT

A pumping loss calculation device for an internal combustion engine, which is capable of accurately calculating the pumping loss of the engine while reflecting thereon the pumping loss which varies with a change in opening timing of an exhaust valve. The pumping loss calculation device calculates a basic amount of a pumping loss torque based on intake and exhaust pressures, a pumping loss torque of the pumping loss torque of the engine, which varies with a change in the opening timing of the exhaust valve, as an exhaust gas sweep-out loss torque, based on the estimated in-cylinder gas amount and a detected exhaust phase, and the pumping loss torque based on the basic amount and the exhaust gas sweep-out loss torque.

4 Claims, 8 Drawing Sheets

(58) Field of Classification Search
USPC .................................................... 73/114.22
See application file for complete search history.

(56) References Cited

U.S. PATENT DOCUMENTS

| | | | | |
|---|---|---|---|---|
| 6,928,988 | B2* | 8/2005 | Nishigaki | F02B 75/22 123/198 F |
| 6,993,427 | B2* | 1/2006 | Ueda | F02D 41/1498 123/179.16 |
| 7,536,249 | B2* | 5/2009 | Muller | F02D 41/1448 701/102 |
| 9,127,614 | B2* | 9/2015 | Ueno | F02D 41/10 |
| 9,284,897 | B2* | 3/2016 | Ueno | F02D 41/0002 |
| 2002/0189592 | A1* | 12/2002 | Nishigaki | F02B 75/22 123/481 |
| 2003/0121500 | A1* | 7/2003 | Shimizu | F01L 1/3442 123/406.45 |
| 2004/0044461 | A1* | 3/2004 | Ueda | F02D 41/1498 701/111 |
| 2009/0018748 | A1* | 1/2009 | Muller | F02D 41/1448 701/102 |

FOREIGN PATENT DOCUMENTS

| | | |
|---|---|---|
| DE | 103 32 825 A1 | 3/2004 |
| DE | 103 40 439 A1 | 4/2004 |
| DE | 603 09 083 T2 | 3/2007 |
| JP | 2007-192155 A | 8/2007 |
| JP | 2010-038093 A | 2/2010 |
| JP | 4609279 B2 | 1/2011 |
| JP | 2013-231407 A | 11/2013 |

OTHER PUBLICATIONS

A. Witt: "Analysis of the Thermodynamic Losses of a Gasoline Engine Under the Edge Conditions of Variable Valve Timing", University of Technology Graz; 1999.
Wikipedia: Ladungswechsel (chargecycle), "Charge Exchange" Sep. 25, 2013.
German Search Report 10 2015 201 061.9 issued May 4, 2015.
German Office Action 10 2015 201 061.9 issued May 6, 2015.

* cited by examiner

NON-SUPERCHARGED STATE

SUPERCHARGED STATE

PUMPING LOSS CALCULATION DEVICE FOR INTERNAL COMBUSTION ENGINE

BACKGROUND OF THE INVENTION

Field of the Invention

The present invention relates to a pumping loss calculation device for an internal combustion engine, which has a variable valve mechanism which is capable of changing the opening timing of an exhaust valve.

Description of the Related Art

Conventionally, as the control device of this kind for controlling the pumping loss of the engine, one disclosed in the Publication of Japanese Patent No. 4609279 is known. This control device controls the pumping loss of the engine by controlling a variable valve mechanism which changes a valve opening characteristic of an exhaust valve, and a throttle valve which is disposed in an intake passage. For example, during the fuel cut operation, if it is determined that deceleration is requested, there are simultaneously performed an exhaust valve opening timing (EVO) advance control for advancing the EVO such that it becomes slightly earlier than a middle stage or its vicinity of an expansion stroke, and a throttling control for throttling a throttle valve.

The exhaust valve is opened according to this EVO advance control in the middle of the expansion stroke, so that an in-cylinder pressure is suddenly lowered to the atmospheric pressure, whereby positive work done is significantly reduced and the pumping loss is relatively increased. Further, negative pressure in the intake stroke is increased by the throttling control, whereby the pumping loss is increased. Furthermore, in this control device, a sum of the pumping loss by the EVO advance and the pumping loss by the throttling control is calculated, and the EVO advance control and the throttling control continue to be performed until the sum reaches a target value. This makes it possible to obtain a required pumping loss, and ensure an engine brake force according to the deceleration request.

The pumping loss of the engine acts as a loss of positive work done which is performed by compression and expansion of gases in the cylinder, and hence even though the combustion torque generated by the compression and expansion of gases is the same, the net torque output from the engine varies with the pumping loss. Therefore, when performing cooperative control using the output torque of the engine, such as traction control or stability control of the vehicle by distributing a driving force from the engine to wheels, it is essential to calculate the pumping loss of the engine with high accuracy.

However, the above-described conventional control device controls the pumping loss of the engine merely by controlling the EVO such that it is advanced. Further, although the Publication of Japanese Patent No. 4609279 mentions calculation of the pumping loss caused by advancing of the EVO, there is disclosed no specific method of calculating the pumping loss. Therefore, it is impossible to calculate the pumping loss with high accuracy.

SUMMARY OF THE INVENTION

It is an object of the present invention to provide a pumping loss calculation device for an internal combustion engine, which is capable of accurately calculating the pumping loss of the engine while reflecting thereon variation of the pumping loss caused especially when opening timing of an exhaust valve is changed.

To attain the above object, the present invention provides a pumping loss calculation device for an internal combustion engine having a variable valve mechanism which is capable of changing opening timing of an exhaust valve, comprising intake and exhaust pressure-acquiring means for acquiring an intake pressure and an exhaust pressure, in-cylinder gas amount-estimating means for estimating an amount of gases which exist within a cylinder as an in-cylinder gas amount, exhaust valve opening timing parameter-detecting means for detecting an exhaust valve opening timing parameter indicative of the opening timing of the exhaust valve, basic amount-calculating means for calculating a basic amount of a pumping loss of the engine based on the acquired intake pressure and exhaust pressure, exhaust gas sweep-out loss-calculating means for calculating a pumping loss of the pumping loss of the engine, which varies with a change in the opening timing of the exhaust valve, as an exhaust gas sweep-out loss, based on the estimated in-cylinder gas amount and the detected exhaust valve opening timing parameter, and pumping loss-calculating means for calculating the pumping loss of the engine based on the calculated basic amount and the calculated exhaust gas sweep-out loss.

In this internal combustion engine, the opening timing of the exhaust valve is changed by the variable valve mechanism. Further, according to the pumping loss calculation device of the present invention, the intake pressure and the exhaust pressure are acquired, and the basic amount of the pumping loss of the engine is calculated based on the acquired intake pressure and exhaust pressure. The basic amount corresponds to negative work done which is done to a piston by gases in a cylinder due to a difference between the exhaust pressure and the intake pressure, during a time period from an exhaust stroke to an intake stroke, i.e. a basic part of the pumping loss of the engine, and is approximately represented by an area of region A enclosed by a line corresponding to the exhaust stroke and a line corresponding to the intake stroke in PV diagrams in FIGS. 9A and 9B. Therefore, it is possible to accurately calculate the basic amount of the pumping loss based on the acquired actual intake pressure and exhaust pressure.

Further, according to the present invention, separately from the basic amount of the pumping loss, the exhaust gas sweep-out loss is calculated. As described hereinafter, the exhaust gas sweep-out loss corresponds to a pumping loss of the pumping loss of the engine for sweeping out combustion gases from the cylinder, which varies with a change in the opening timing of the exhaust valve. That is, in a case where the exhaust valve is opened at a relatively early timing during the expansion stroke, the combustion gases start to be exhausted from the cylinder earlier, as indicated by solid lines in FIGS. 9A and 9B, and hence the in-cylinder pressure is sufficiently lowered at an exhaust bottom dead center (hereinafter referred to as "the exhaust BDC"). In this state, the exhaust stroke is started, and hence the pumping loss at the time is small.

In contrast, in a case where the exhaust valve is opened at a later timing during the expansion stroke, by a change in the valve opening timing by the variable valve mechanism, the combustion gases start to be exhausted from the cylinder at a retarded timing, a larger amount of combustion gases remain in the cylinder at the exhaust BDC. Therefore, as indicated by broken lines in FIGS. 9A and 9B, a relatively high pressure remains in the cylinder due to the large amount of combustion gases at the exhaust BDC. Consequently, at the beginning of the exhaust stroke, it is required to sweep out the combustion gases against the high pressure in the cylinder, whereby the pumping loss increases accordingly.

The exhaust gas sweep-out loss corresponds to such a pumping loss which varies with a change in the opening timing of the exhaust valve, and is approximately represented by an area of triangle-shaped region B enclosed by two lines corresponding to the different opening timings of the exhaust valve at the beginning of the exhaust stroke in PV diagrams in FIGS. 9A and 9B.

From above-described occurrence factors, the exhaust gas sweep-out loss depends on the opening timing of the exhaust valve. Further, as the amount of gases which exist in the cylinder is larger, the amount and pressure of gases which remain in the cylinder at the exhaust BDC becomes larger, and hence the exhaust gas sweep-out loss depends on the in-cylinder gas amount. This is obvious from a comparison between FIG. 9A which illustrates a non-supercharged state and FIG. 9B which illustrates a supercharged state.

From the above viewpoint, according to the present invention, the amount of gases which exist in the cylinder is estimated as the in-cylinder gas amount, the exhaust valve opening timing parameter indicative of the opening timing of the exhaust valve is detected, and the exhaust gas sweep-out loss is calculated based on the acquired or detected two parameters. Therefore, it is possible to accurately and properly calculate the exhaust gas sweep-out loss based on factors which have influence thereon.

Further, since the pumping loss of the engine is finally calculated based on the basic amount of the pumping loss and the exhaust gas sweep-out loss calculated as described above, it is possible to accurately calculate the pumping loss of the engine while reflecting thereon the exhaust gas sweep-out loss which varies with a change in the opening timing of the exhaust valve.

Further, in calculating the pumping loss of the engine, it is envisaged, for example, that various factors (parameters) which have influence on the pumping loss may be all extracted, whereby a total amount of the pumping loss is collectively calculated by a multidimensional map or a model formula in which a plurality of the extracted parameters are used. However, as described above, of the pumping loss of the engine, the part related to the base and the exhaust gas sweep-out loss are different in the cause of occurrence, mechanism, and timing. Therefore, with the method for collectively calculating the total amount of the pumping loss, even if the multidimensional map or the model formula is set in a detailed manner, there is a limit to the suitability thereof, so that it is difficult to accurately calculate the pumping loss.

In contrast, according to the present invention, the pumping loss is divided into the basic part and the exhaust gas sweep-out loss, and the basic part and the exhaust gas sweep-out loss are separately calculated using respective sets of appropriate parameters which have influence thereon, whereafter the pumping loss is finally calculated based on the two. Therefore, differently from the case where the total amount of the pumping loss is collectively calculated by a multidimensional map or a model formula, it is possible to accurately calculate the pumping loss.

Preferably, the pumping loss calculation device further comprises engine speed-detecting means for detecting an engine speed, the basic amount-calculating means calculates, further based on the detected engine speed, the basic amount of the pumping loss such that the basic amount of the pumping loss becomes a larger value as the engine speed is larger, and the exhaust gas sweep-out loss-calculating means calculates, further based on the engine speed, the pumping loss of the engine.

Generally, as the engine speed is higher, the intake stroke time period is shorter, so that negative pressure in the intake stroke increases, and hence the basic amount of the pumping loss becomes larger. With the configuration of the preferred embodiment, as the engine speed is higher, the basic amount of the pumping loss is calculated such that it becomes a larger value, which makes it possible to further increase the calculation accuracy of the basic amount.

Further, depending on the engine speed, a pulsation occurs on the exhaust side, which has influence on the amount and pressure of the combustion gases remaining in the cylinder, so that the engine speed affects the exhaust gas sweep-out loss. For this reason, according to the present construction, the exhaust gas sweep-out loss is calculated further based on the engine speed. In this case, for example, it is possible to calculate the exhaust gas sweep-out loss according to the engine speed, based on a relationship between the engine speed and the exhaust gas sweep-out loss, which has been recognized in advance and is different from the above-described case of calculation of the basic amount.

As described above, differently from the case where the total amount of the pumping loss of the engine is collectively calculated by a multidimensional map or a model formula, it is possible to separately and properly calculate the basic amount of the pumping loss and the exhaust gas sweep-out loss using the same parameter of the engine speed while reflecting on the calculations a difference in the manner of influence of the engine speed, and properly calculate the total amount of the pumping loss based on the basic amount of the pumping loss and the exhaust gas sweep-out loss.

Preferably, the engine includes a supercharger for supercharging intake air, and is configured to have a valve overlap period during which the intake valve and the exhaust valve are simultaneously open, and the pumping loss calculation device further comprises intake valve opening timing parameter-detecting means for detecting an intake valve opening timing parameter indicative of opening timing of the intake valve, and exhaust valve closing timing parameter-detecting means for detecting an exhaust valve closing timing parameter indicative of closing timing of the exhaust valve, wherein the in-cylinder gas amount-estimating means estimates the in-cylinder gas amount based on the intake pressure, the detected intake valve opening timing parameter, and the detected exhaust valve closing timing parameter.

With the configuration of this preferred embodiment, the engine includes the supercharger which supercharges intake air, and is configured to have the valve overlap period in which the intake valve and the exhaust valve are simultaneously open. Further, the intake valve opening timing parameter indicative of the opening timing of the intake valve, and the exhaust valve closing timing parameter indicative of the closing timing of the exhaust valve are detected, and the in-cylinder gas amount which is used for calculating the correction amount of the pumping loss are estimated based on the detected intake pressure, the detected intake valve opening timing parameter, and the detected exhaust valve closing timing parameter.

In the engine configured as above, due to supercharging by the supercharger, a valve overlap sometimes occurs in a state where the intake air pressure is larger than the exhaust gas pressure. In this case, there occurs scavenging in which the gases pass from the intake passage toward the exhaust passage via the cylinder. When such scavenging occurs, the amount of gases which exist in the cylinder is not equal to the amount of gases which flow through the intake passage.

Therefore, even if the amount of gases which flow through the intake passage is determined e.g. by detection using an air flow sensor, or estimation by a nozzle equation which is applied between the upstream and the downstream of the throttle valve disposed in the intake passage, the detected value or the estimated value thereof does not properly represent the in-cylinder gas amount.

In contrast, according to the configuration of the preferred embodiment, the in-cylinder gas amount is estimated based on the detected intake air pressure, the detected intake valve opening timing parameter, and the detected exhaust valve closing timing parameter, so that it is possible to accurately estimate the in-cylinder gas amount, to thereby further enhance the calculation accuracy of the exhaust gas sweep-out loss and the pumping loss of the engine.

Further, in a case where the engine includes the supercharger, as the amount of the intake air into the cylinder becomes larger due to supercharging by the supercharger, the amount of gases existing in the cylinder increases, and the exhaust gas pressure at a location upstream of the turbine of the supercharger also becomes higher, so that the exhaust gas sweep-out loss tends to increase significantly. Also in the case where the exhaust gas sweep-out loss thus increases significantly, by estimating the exhaust gas sweep-out loss based on the above-described three parameters, the high estimation accuracy can be ensured and hence the advantageous effects of the present invention can be markedly obtained.

The above and other objects, features, and advantages of the present invention will become more apparent from the following detailed description taken in conjunction with the accompanying drawings.

DETAILED DESCRIPTION OF PREFERRED EMBODIMENTS

The invention will now be described in detail with reference to drawings showing a preferred embodiment thereof.

Figure 1:
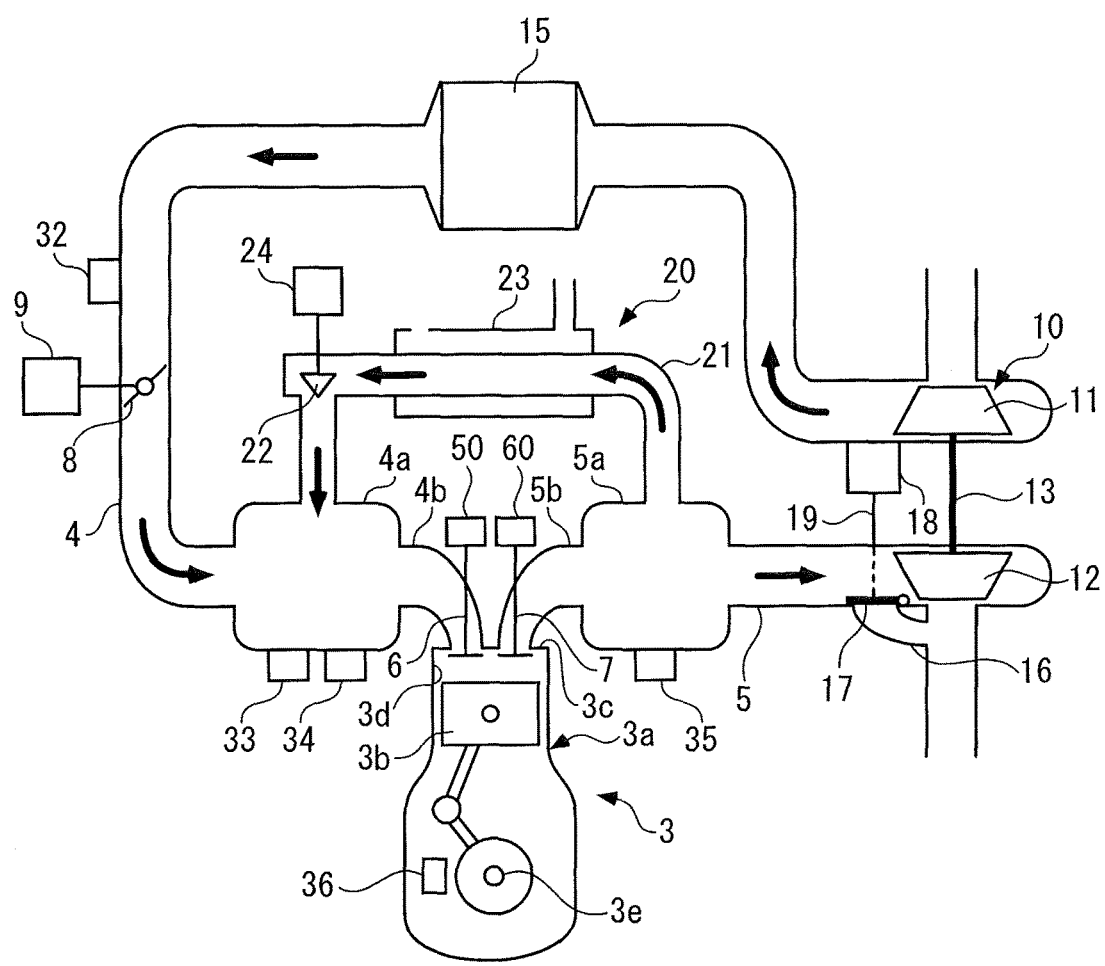
FIG. 1 is a schematic diagram of an internal combustion engine to which is applied the present invention.

FIG. 1 shows an internal combustion engine (hereinafter referred to as "the engine") 3 to which the present invention is applied. The engine 3 is a gasoline engine installed on a vehicle (not shown). Accessories ACC, such as a compressor of an air conditioner and a power steering unit, and a transmission TM are connected to a crankshaft 3e of the engine 3 (see FIG. 4). After being used for driving the accessories ACC, the power from the engine 3 is input to the transmission TM, and is further transmitted to the drive wheels (none of which are shown).

The engine 3 has e.g. four cylinders 3a (only one of which is shown). A combustion chamber 3d is defined between a piston 3b and a cylinder head 3c of each of the cylinders 3a of the engine 3. Each cylinder 3a has an intake passage 4 connected to the combustion chamber 3d of the cylinder 3a via an intake manifold 4b having an intake collector 4a, and has an exhaust passage 5 connected to the combustion chamber 3d of the cylinder 3a via an exhaust manifold 5b having an exhaust collector 5a.

The intake manifold 4b is provided with fuel injection valves 41 (see FIG. 2) on a cylinder-by-cylinder basis, and the cylinder head 3c is provided with spark plugs 42 (see FIG. 2) on a cylinder-by-cylinder basis. An amount of fuel injected by the fuel injection valve 41 and an ignition timing of the spark plug 42 are controlled by an ECU 2, described hereinafter.

Further, an intake port and an exhaust port which communicate with the intake passage 4 and the exhaust passage 5, respectively, are provided with an intake valve 6 and an exhaust valve 7, respectively. The intake valve 6 is driven by an intake-side variable valve mechanism 50, and the exhaust valve 7 is driven by an exhaust-side variable valve mechanism 60.

The intake-side variable valve mechanism 50 steplessly changes an intake valve opening timing IVO and an intake valve closing timing IVC of the intake valve 6, with an opening angle period in a constant state, by steplessly changing a relative phase of the intake valve 6 (hereinafter referred to as "the intake phase CAIN") with respect to the crankshaft 3e, and includes e.g. a phase control motor 51 (see FIG. 2). The phase control motor 51 rotates an intake cam shaft (not shown) relative to the crankshaft 3e according to a control signal from the ECU 2, to thereby steplessly change the intake phase CAIN within a predetermined range.

The exhaust-side variable valve mechanism 60, which is configured similarly to the intake-side variable valve mechanism 50, steplessly changes an exhaust valve opening timing EVO and an exhaust valve closing timing EVC of the exhaust valve 7, with an opening angle period in a fixed state, by steplessly changing a relative phase of the exhaust valve 7 (hereinafter referred to as "the exhaust phase CAEX") with respect to the crankshaft 3e, and includes a phase control motor 61 (see FIG. 2). The phase control motor 61 rotates an exhaust cam shaft (not shown) relative to the crankshaft 3e according to a control signal from the ECU 2, to thereby steplessly change the exhaust phase CAEX within a predetermined range.

Figure 3:
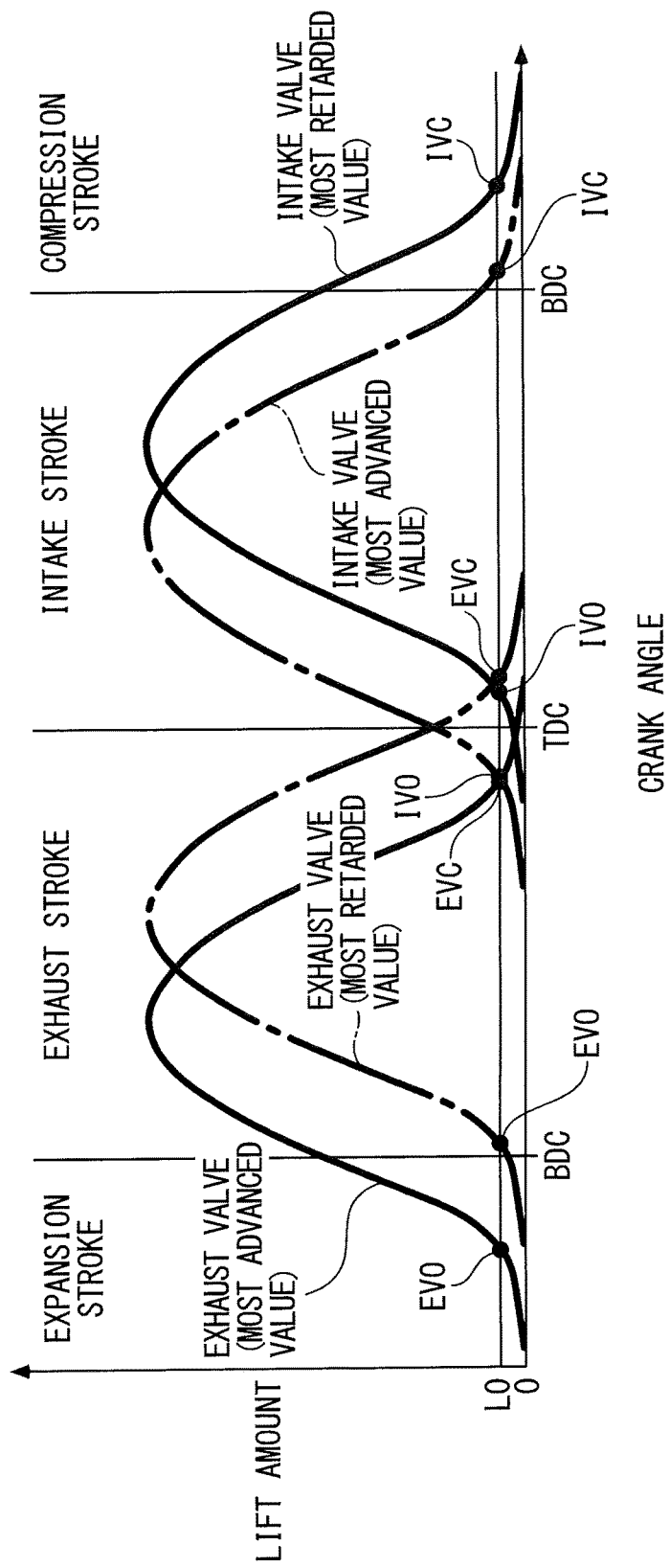
FIG. 3 is a diagram showing valve lift curves of an intake valve and an exhaust valve obtained by respective intake-side and exhaust-side variable valve mechanisms.

FIG. 3 shows valve timings of the intake valve 6 and the exhaust valve 7, which are set by the intake-side and the exhaust-side variable valve mechanisms 50 and 60. Note that in the present embodiment, the opening and closing valve timings of the intake valve 6 and exhaust valve 7 are each defined as a timing at which the lift amount thereof reaches a predetermined small amount L0 which is close to 0 (e.g. 1 mm).

Referring to FIG. 3, the intake valve 6 is opened and closed at a desired timing between a most retarded timing indicated by a solid line and a most advanced timing indicated by a one-dot-chain line, and the exhaust valve 7 is opened and closed at a desired timing between a most advanced timing indicated by a solid line and a most retarded timing indicated by a one-dot-chain line. Further, when the intake phase CAIN is controlled to be advanced and the exhaust phase CAEX is controlled to be retarded, a valve overlap in which the intake valve 6 and the exhaust valve 7 are simultaneously open occurs around the intake top dead center (hereinafter referred to as "the intake TDC") at the start of the intake stroke, whereby an internal EGR amount is obtained.

Figure 2:
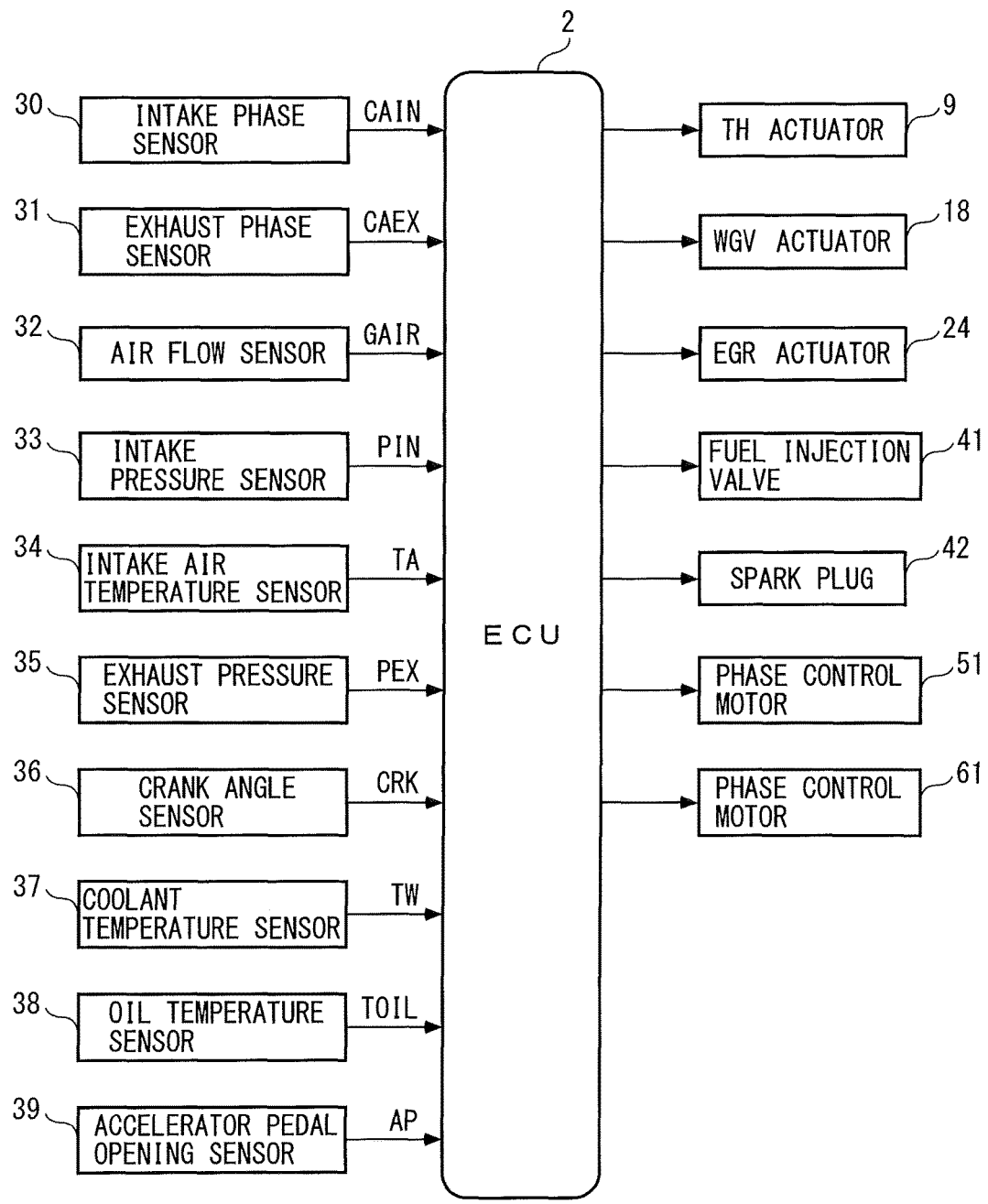
FIG. 2 is a block diagram of a control system including a pumping loss calculation device.

Further, the intake-side and the exhaust-side variable valve mechanisms 51 and 61 are provided with an intake phase sensor 30 and an exhaust phase sensor 31, respectively (see FIG. 2). The two phase sensors 30 and 31 detect the intake phase CAIN and the exhaust phase CAEX via rotation angles of the phase control motors 51 and 61, respectively, and delivers signals indicative of the detected intake phase CAIN and the exhaust phase CAEX to the ECU 2.

As described above, since the opening angle periods of the intake valve 6 and the exhaust valve 7 are fixed, the intake valve opening timing IVO and the intake valve closing timing IVC of the intake valve 6 at the time are unconditionally determined from the detected intake phase CAIN, and the exhaust valve opening timing EVO and the exhaust valve closing timing EVC of the exhaust valve 7 at the time are unconditionally defined from the detected exhaust phase CAEX. That is, the intake phase CAIN is a parameter indicative of both the intake valve opening timing IVO and the intake valve closing timing IVC of the intake valve 6, and the exhaust phase CAEX is a parameter indicative of both the exhaust valve opening timing EVO and the exhaust valve closing timing EVC of the exhaust valve 7.

Referring again to FIG. 1, a throttle valve 8 is disposed in the intake passage 4 at a location upstream of the intake collector 4a. The throttle valve 8 is liked to a TH actuator 9 comprised of a DC motor. An opening degree of the throttle valve 8 is controlled by controlling electric current supplied to the TH actuator 9 by the ECU 2, whereby the amount of intake air drawn into the combustion chamber 3d is regulated.

Further, the engine 3 is provided with a supercharger 10 of a turbocharger type. The supercharger 10 is comprised of a compressor 11 disposed in the intake passage 4 at a location upstream of the throttle valve 8, a turbine 12 disposed in the exhaust passage 5 at a location downstream of the exhaust collector 5a, and a shaft 13 integrally linking the compressor 11 and the turbine 12 to each other. In the supercharger 10, as the turbine 12 is driven for rotation by exhaust gases, the compressor 11 integrally linked thereto is rotated, whereby a supercharging operation for pressurizing intake air in the intake passage 4 is performed. An intercooler 15 is disposed in the intake passage 4 at a location downstream of the compressor 11, for cooling the pressurized intake air.

The exhaust passage 5 is provided with a bypass passage 16 bypassing the turbine 12, and the bypass passage 16 is provided with a wastegate valve 17 (hereinafter referred to as "the WGV 17"). The WGV 17 is linked to a WGV actuator 18 which is comprised of a DC motor, via a linking member 19. An opening degree of the WGV 17 is controlled by controlling electric current supplied to the WGV actuator 18 by the ECU 2. This regulates the amount of exhaust gases flowing through the bypass passage 16 to regulate a driving force of the turbine 12, whereby the supercharging pressure of the supercharger 10 is controlled.

Further, the engine 3 is provided with an EGR device 20 for recirculating part of exhaust gases discharged into the exhaust passage 5 to the intake passage 4. The EGR device 20 is comprised of an EGR passage 21, an EGR control valve 22 disposed in the EGR passage 21, and an EGR cooler 23. The EGR passage 21 is connected to the exhaust collector 5a of the exhaust passage 5 and the intake collector 4a of the intake passage 4.

The EGR control valve 22 is linked to an EGR actuator 24 comprised of a DC motor. An opening degree of the EGR control valve 22 is controlled by controlling electric current supplied to the EGR actuator 24 by the ECU 2, whereby the amount of exhaust gases recirculated from the exhaust passage 5 to the intake passage 4 (hereinafter referred to as "the EGR amount") is controlled. The EGR cooler 23 cools high-temperature exhaust gases flowing through the EGR passage 21 using coolant of the engine 3.

Further, the intake passage 4 is provided with an air flow sensor 32 at a location upstream of the throttle valve 8. Further, the intake collector 4a is provided with an intake pressure sensor 33 and an intake air temperature sensor 34, and the exhaust collector 5a is provided with an exhaust pressure sensor 35. The air flow sensor 32 detects an intake air amount GAIR, the intake pressure sensor 33 detects an intake pressure PIN at a location downstream of the throttle valve 8, the intake air temperature sensor 34 detects an intake air temperature TA, and the exhaust gas pressure sensor 35 detects an exhaust pressure PEX. These detection signals are input to the ECU 2.

Further, the crankshaft 3e is provided with a crank angle sensor 36. The crank angle sensor 36 delivers a CRK signal, which is a pulse signal, to the ECU 2 along with rotation of the crankshaft 3e, whenever the crankshaft rotates through a predetermined crank angle (e.g. 30'). The ECU 2 calculates a rotational speed NE of the engine 3 (hereinafter referred to as "the engine speed NE") based on the CRK signal.

Further, input to the ECU 2 are a detection signal indicative of a temperature TW of engine coolant of the engine 3 (hereinafter referred to as "the engine coolant temperature TW") from a coolant temperature sensor 37, a detection signal indicative of a temperature TOIL of lubricating oil in the engine 3 (hereinafter referred to as "the oil temperature TOIL") from an oil temperature sensor 38, and a detection signal indicative of an operation amount AP of an accelerator pedal of the vehicle from an accelerator pedal opening sensor 39.

The ECU 2 is implemented by a microcomputer comprised of a CPU, a RAM, a ROM, and an I/O interface (none of which are shown). The ECU 2 determines operating conditions of the engine 3 based on the input detection signals from the above-described sensors 30 to 39. Further, according to the determined results, the ECU 2 performs various control processes for controlling operations of the engine 3, by delivering drive signals to the devices shown on the right side of FIG. 2. In the present embodiment, the ECU 2 corresponds to in-cylinder gas amount estimation means, basic amount calculation means, exhaust gas sweep-out loss calculation means, and pumping loss calculation means.

Figure 4:
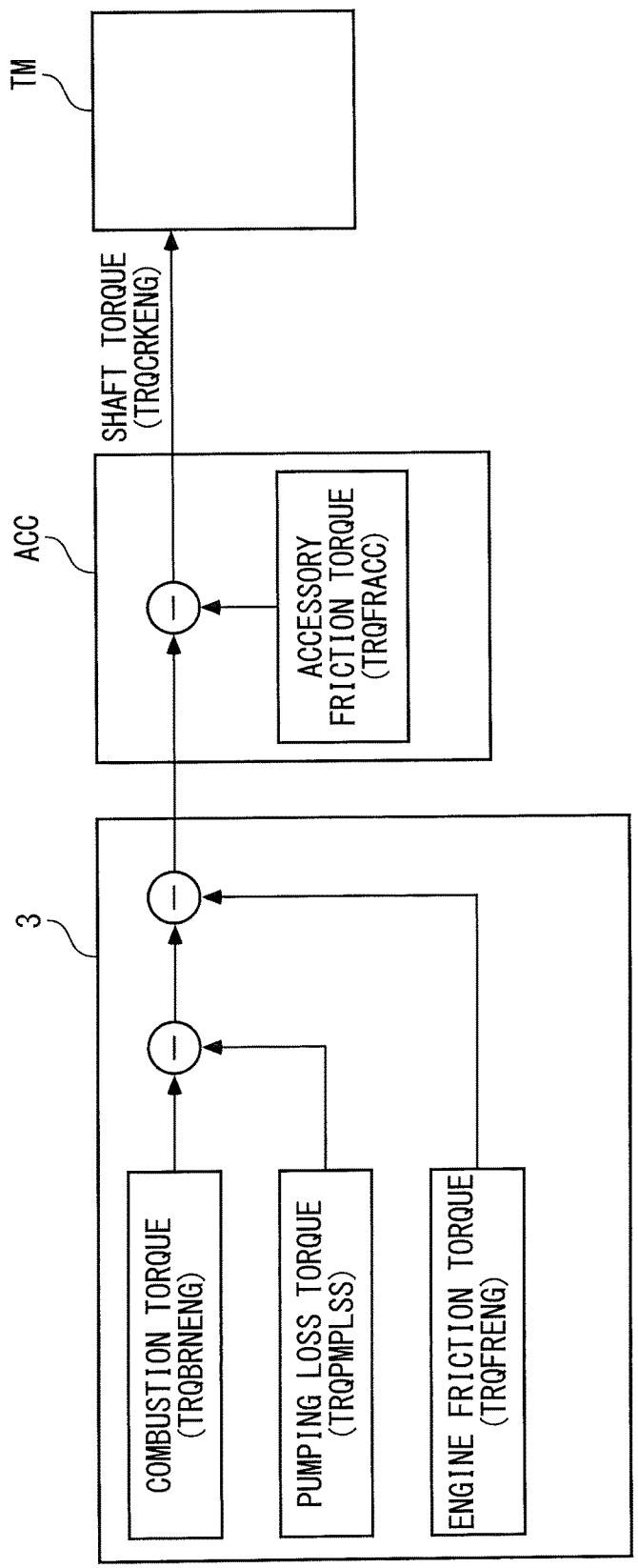
FIG. 4 is a diagram showing relations between various torques, such as a combustion torque, a pumping loss torque, and a shaft torque of the engine.

Next, a description will be given of a shaft torque estimation process for estimating a shaft torque TRQCRKENG of the engine 3, which is performed by the ECU 2, with reference to FIGS. 4 to 8. The shaft torque TRQCRKENG is a net torque which is output from the engine 3 toward the transmission TM, and is used for cooperative control such as traction control and stability control of the vehicle. As shown in FIG. 4, the shaft torque TRQCRKENG is calculated by subtracting a pumping loss torque TRQPMPLSS, an engine friction torque TRQFRENG, and an accessory friction torque TRQFRACC from a combustion torque TRQBRNENG generated by the combustion of the engine 3.

Here, the pumping loss torque TRQPMPLS is a torque which is lost by pumping loss during the combustion cycle, the engine friction torque TRQFRENG is a torque which is lost by friction occurring between the piston 3b and an inner wall surface of the cylinder 3a in the engine 3, and the accessory friction torque TRQFRACC is a torque which is lost by being consumed for driving the accessories ACC.

Figure 5:
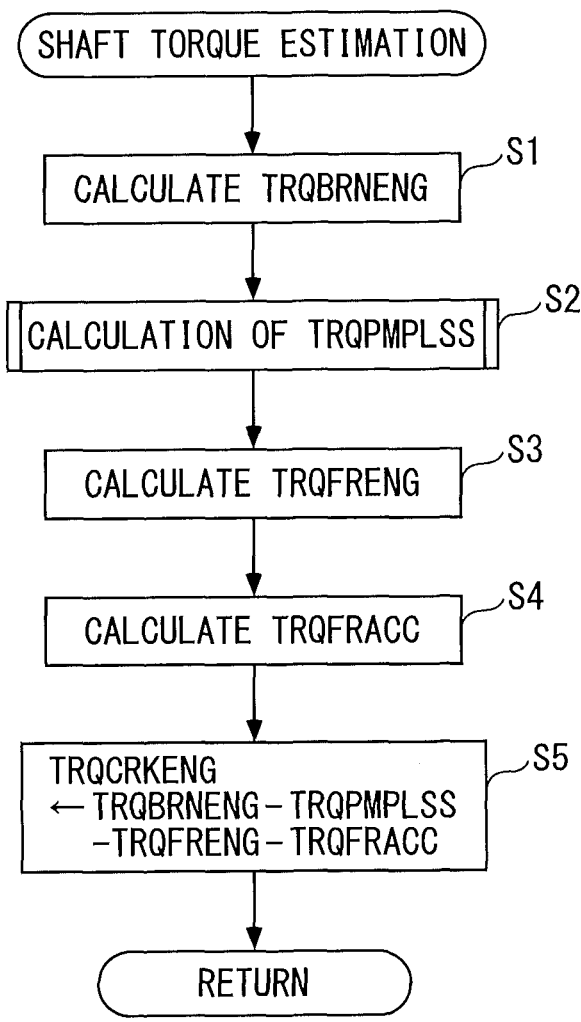
FIG. 5 is a flowchart of a main flow of a shaft torque estimation process.

FIG. 5 is a main flow of a shaft torque estimation process which is repeatedly performed at predetermined time intervals. The present process conforms to the above-described flow in FIG. 4, and in a step 1 (shown as S1 in abbreviated form; the following steps are also shown in abbreviated form), the combustion torque TRQBRNENG is calculated. The calculation is performed e.g. based on an in-cylinder gas amount GAIRCYL, referred to hereinafter, an internal EGR ratio obtained by the valve overlap, and an ignition timing-retarded amount from the MBT (Minimum advance for the Best Torque).

Next, the pumping loss torque TRQPMPLSS is calculated (step 2). Details of a calculation process for calculating the pumping loss torque TRQPMPLSS will be described hereinafter.

Next, the engine friction torque TRQFRENG is calculated (step 3). The calculation of the engine friction torque TRQFRENG is performed e.g. based on the engine speed NE, the engine coolant temperature TW, the oil temperature TOIL, which are detected as described above. Then, the accessory friction torque TRQFRACC is calculated (step 4). The calculation of the accessory friction torque TRQFRACC is performed e.g. based on whether or not the accessories ACC are in operation and load of the accessories ACC, and according to the engine speed NE, the intake air temperature TA, and the like.

Finally, the shaft torque TRQCRKENG of the engine 3 is estimated as a value obtained by subtracting the three torques TRQPMPLSS, TRQFRENG, and TRQFRACC calculated in the steps 2 to 4 from the combustion torque TRQBRNENG calculated in the step 1 (step 5), followed by terminating the present process.

Figure 6:
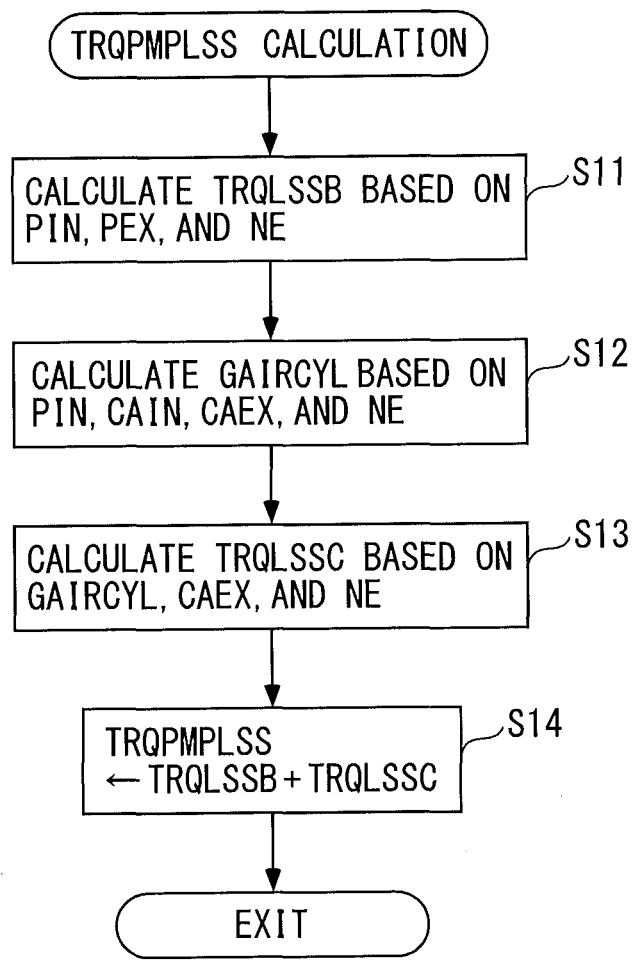
FIG. 6 is a flowchart of a subroutine of a calculation process for calculating a pumping loss torque.

FIG. 6 is a flowchart of a subroutine of the calculation process for calculating the pumping loss torque TRQPMPLSS, which is performed in the above-described step 2. In the present process, first, in a step 11, a basic value TRQLSSB of the pumping loss torque TRQPMPLSS is calculated by searching a map shown in FIG. 7 according to the exhaust pressure PEX, the detected intake pressure PIN, and the detected engine speed NE, which are detected as described above (step 11).

Figure 9A:
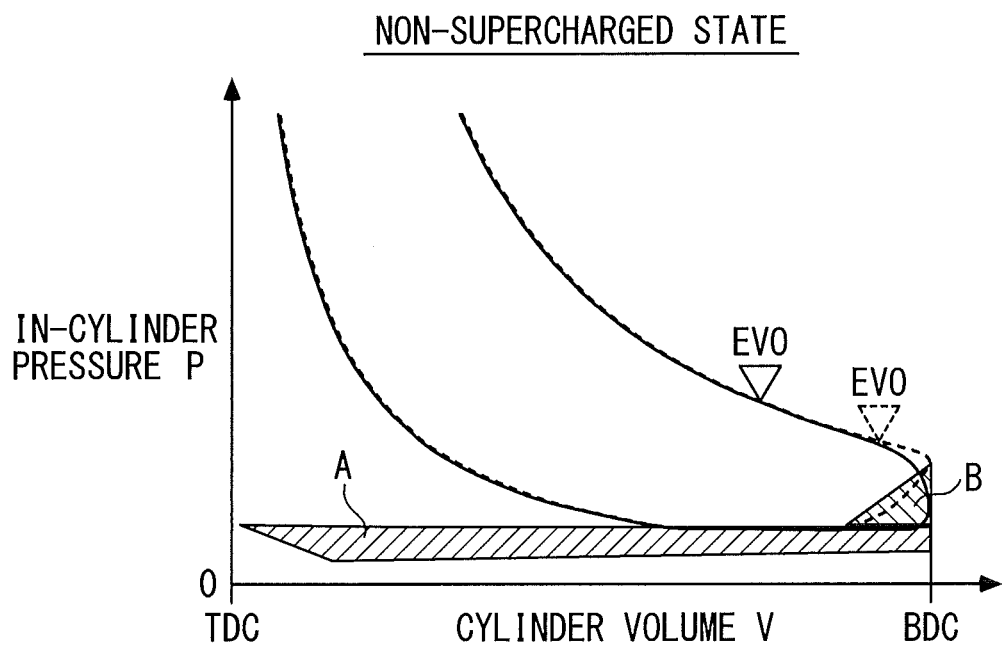
FIG. 9A is a PV diagram showing a relationship between cylinder volume and in-cylinder pressure in a non-supercharged state, which is useful in explaining a basic amount of pumping loss and an exhaust gas sweep-out loss.
Figure 9B:
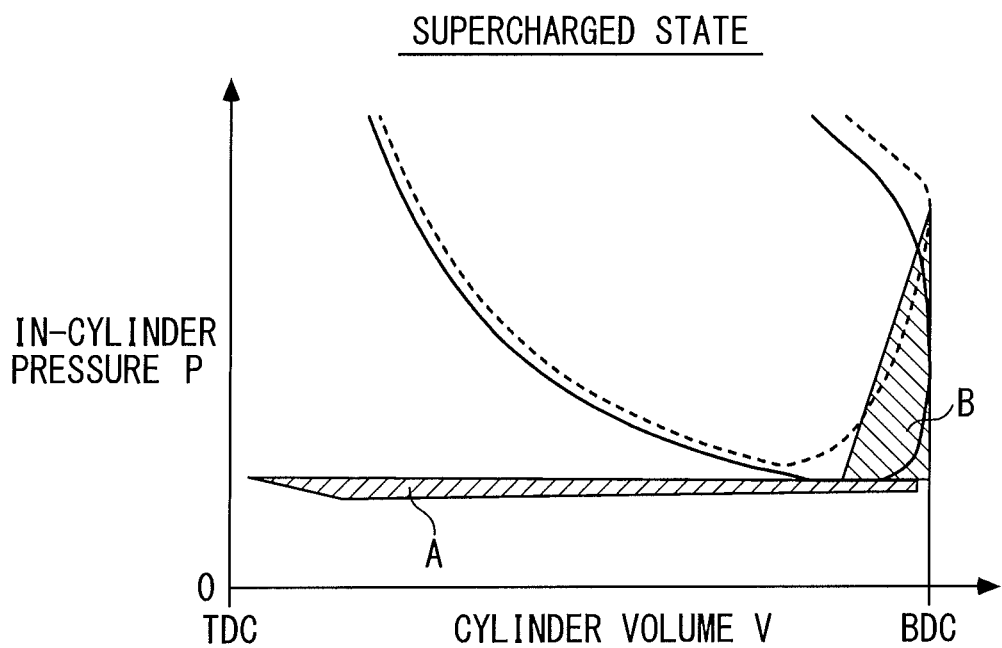
FIG. 9B is a PV diagram showing a relationship between cylinder volume and in-cylinder pressure in a supercharged state, which is useful in explaining the basic amount of pumping loss and the exhaust gas sweep-out loss.

The basic amount TRQLSSB corresponds to a pumping loss of the pumping loss torque TRQPMPLSS of the engine 3, which occurs during a time period from the exhaust stroke to the intake stroke due to a pressure difference between the exhaust pressure PEX and the intake pressure PIN (region A in FIGS. 9A and 9B). Therefore, in the map in FIG. 7, as the pressure difference AP between the exhaust pressure PEX and the intake pressure PIN is larger, the basic amount TRQLSSB is set to a larger value.

Figure 7:
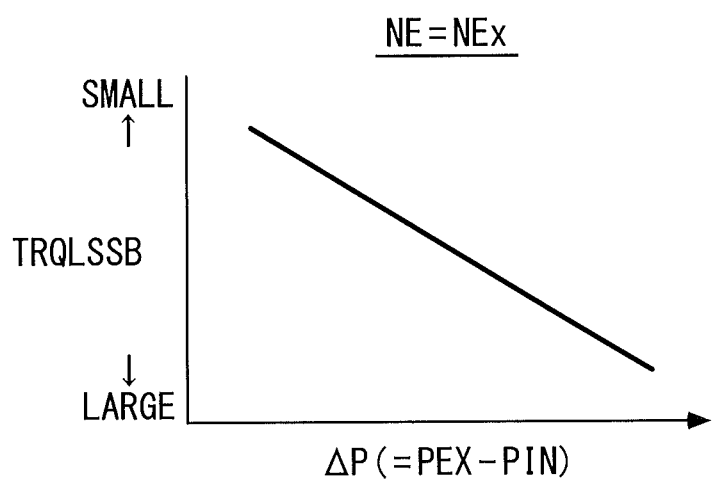
FIG. 7 is a map for use in calculation of a basic amount of the pumping loss torque in the calculation process in FIG. 6.

Note that FIG. 7 illustrates, byway of example, the map in a case where the engine speed NE is equal to a predetermined engine speed NEx. Although not shown, actually, there are provided a plurality of maps which are associated with a plurality of predetermined engine speed values NE1 to NEn, respectively. In any of these maps, the basic amount TRQLSSB is set to have the same tendency with respect to the pressure difference AP as that in FIG. 7. Further, in the plurality of maps, as the engine speed NE is larger, a time period of the intake stroke is shorter, which increases negative pressure in the intake stroke, and hence the basic amount TRQLSSB is set to a larger value.

Next, in a step 12, the in-cylinder gas amount GAIRCYL is calculated by searching a map, not shown, according to the intake pressure PIN, the intake phase CAIN, the exhaust phase CAEX, and the engine speed NE, which are detected as described above.

The in-cylinder gas amount GAIRCYL is used for calculating an exhaust gas sweep-out loss torque TRQLSSC, described hereinafter, and hence should be recognized not as an amount of gases sucked into the cylinder 3a but as an amount of gases actually existing in the cylinder 3a. Further, the intake pressure PIN represents a pressure of intake air supercharged by the supercharger 10, the engine speed NE represents a speed of the intake air, and, as described above, the intake phase CAIN and the exhaust phase CAEX represent the intake valve opening timing IVO of the intake valve 6 and the exhaust valve closing timing EVC of the exhaust valve 7, respectively.

Therefore, by calculating the in-cylinder gas amount GAIRCYL according to the above-described four parameters, even in a case where a valve overlap of the intake valve 6 and the exhaust valve 7 occurs in a state where the intake pressure PIN is larger than the exhaust pressure PEX, due to the supercharging by the supercharger 10, it is possible to accurately calculate the in-cylinder gas amount GAIRCYL while reflecting thereon an amount of scavenged gases which pass from the intake passage 4 toward the exhaust passage 5 via the cylinder 3a.

Figure 8:
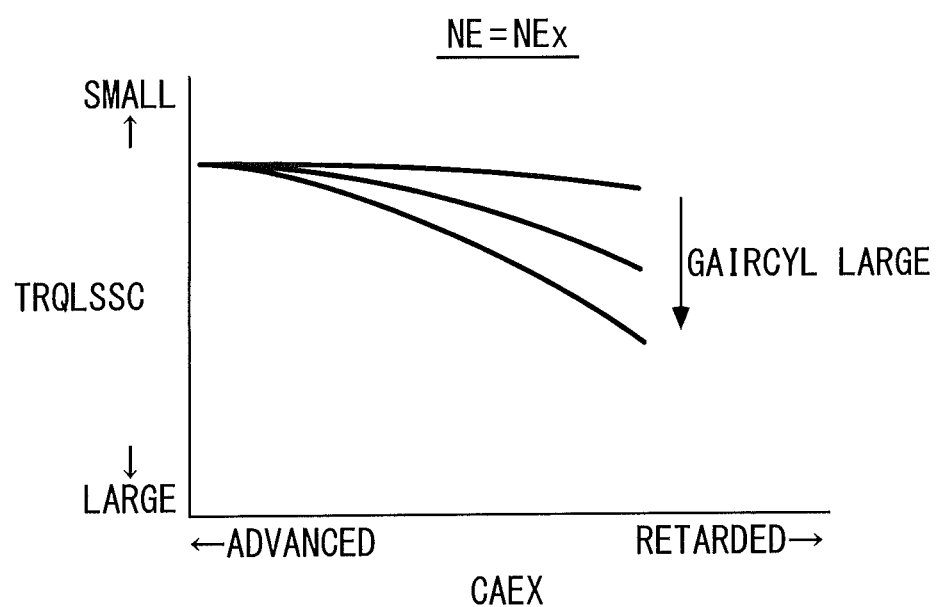
FIG. 8 is a map for use in calculation of an exhaust gas sweep-out loss in the calculation process in FIG. 6.

Next, in a step 13, the exhaust gas sweep-out loss torque TRQLSSC is calculated by searching a map shown in FIG. 8 according to the in-cylinder gas amount GAIRCYL which is calculated as described above, the exhaust phase CAEX, and the engine speed NE. The exhaust gas sweep-out loss torque TRQLSSC corresponds to a pumping loss of the pumping loss torque TRQPMPLSS of the engine 3, which varies with a change in the exhaust valve opening timing EVO of the exhaust valve 7, and occurs at the beginning of the exhaust stroke (region B in FIGS. 9A and 9B).

In the map in FIG. 8, as the in-cylinder gas amount GAIRCYL is larger, and the exhaust phase CAEX is more retarded, the amount of gases remaining in the cylinder 3a becomes larger at the exhaust BDC, and hence the exhaust gas sweep-out loss torque TRQLSSC is set to a larger value.

Note that FIG. 8 illustrates, byway of example, the map in a case where the engine speed NE is equal to a predetermined engine speed NEx. Although not shown, actually, there are provided a plurality of maps which are associated with a plurality of predetermined engine speed values NE1 to NEn, respectively. In any of these maps, the exhaust gas sweep-out loss torque TRQLSSC is set to have the same tendency with respect to the in-cylinder gas amount GAIRCYL and the exhaust phase CAEX as that in FIG. 8.

Further, in the plurality of maps, the exhaust gas sweep-out loss torque TRQLSSC is set to reflect influence of exhaust pulsation according to the engine speed NE, which is empirically determined in advance e.g. based on experimental results.

Next, in a step 14, the pumping loss torque TRQPMPLSS of the engine 3 is calculated by adding the exhaust gas sweep-out loss torque TRQLSSC calculated in the step 13 to the basic amount TRQLSSB calculated in the step 11, followed by terminating the present process.

As described above, according to the present embodiment, the basic amount TRQLSSB which corresponds to the basic part of the pumping loss of the pumping loss torque TRQPMPLSS of the engine 3, which occurs during a time period from the exhaust stroke to the intake stroke due to the pressure difference between the exhaust pressure PEX and the intake pressure PIN, is calculated based on the intake pressure PIN and the exhaust pressure PEX, which are detected. Further, separately from the basic amount TRQLSSB, the exhaust gas sweep-out loss torque TRQLSSC of the pumping loss torque TRQPMPLSS of the engine 3, which varies with a change in the exhaust valve opening timing EVO of the exhaust valve 7 and occurs at the beginning of the exhaust stroke, is calculated based on the in-cylinder gas amount GAIRCYL, the exhaust phase CAEX, and the engine speed NE.

Then, finally, the pumping loss torque TRQPMPLSS is calculated by adding the calculated basic amount TRQLSSB to the exhaust gas sweep-out loss torque TRQLSSC.

As described above, the pumping loss torque TRQPMPLSS is divided into the basic amount TRQLSSB and the exhaust gas sweep-out loss torque TRQLSSC, and the two are calculated using respective sets of appropriate parameters which have influence on them. Therefore, differently from a case where the total amount of pumping loss torque of the engine 3 is collectively calculated by a multidimensional map or a model formula, it is possible to accurately calculate the pumping loss torque TRQPMPLSS while reflecting thereon the exhaust gas sweep-out loss which varies with a change in the exhaust valve opening timing EVO of the exhaust valve 7.

Further, the basic amount TRQLSSB and the exhaust gas sweep-out loss torque TRQLSSC are calculated further based on the engine speed NE, and when the former is calculated, the basic amount TRQLSSB is set to a larger value as the engine speed NE is larger, whereas when the latter is calculated, the exhaust gas sweep-out loss torque TRQLSSC is set such that it reflects the influence of exhaust pulsation dependent on the engine speed NE.

Therefore, differently from the case where the total amount of the pumping loss torque of the engine 3 is collectively calculated by a multidimensional map or a model formula, it is possible to separately and appropriately calculate the basic amount TRQLSSB and the exhaust gas sweep-out loss torque TRQLSSC using the same parameter of the engine speed NE while reflecting on the calculations a difference in the manner of influence of the engine speed NE, and properly calculate the total amount of the pumping loss torque TRQPMPLSS of the engine 3 based on the basic amount TRQLSSB and the exhaust gas sweep-out loss torque TRQLSSC.

Further, the in-cylinder gas amount GAIRCYL is calculated based on the intake pressure PIN, the intake phase CAIN, the exhaust phase CAEX, and the engine speed NE. Therefore, although in a case where scavenging occurs from the intake passage 4 toward the exhaust passage 5 due to the valve overlap in a state where the intake pressure PIN is larger than the exhaust pressure PEX due to supercharging by the supercharger 10, it is possible to accurately calculate the in-cylinder gas amount GAIRCYL while reflecting thereon an amount of scavenged gases, to thereby accurately obtain the exhaust gas sweep-out loss torque TRQLSSC and the pumping loss torque TRQPMPLSS.

Note that the present invention is by no means limited to the above-described embodiment, but it can be practiced in various forms. For example, although in the embodiment, the exhaust pressure PEX is acquired by detection by the exhaust pressure sensor 35, it may be acquired by estimating from any other suitable acquiring means, such as the exhaust gas temperature, a pressure at a location downstream of the turbine 12 of the supercharger 10, and an opening degree of the WGV 17.

Further, although in the embodiment, the present invention is applied to the automotive gasoline engine, by way of example, this is not limitative, but it can be applied to various engines other than the gasoline engine, such as a diesel engine, and further, it can be applied to engines other than the engines for automotive vehicles, such as engines for ship propulsion machines, e.g. an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. A pumping loss calculation device for an internal combustion engine having a variable valve mechanism which is capable of changing opening timing of an exhaust valve, comprising:
   intake and exhaust pressure-acquiring means for acquiring an intake pressure and an exhaust pressure;
   in-cylinder gas amount-estimating means for estimating an amount of gases which exist within a cylinder as an in-cylinder gas amount;
   exhaust valve opening timing parameter-detecting means for detecting an exhaust valve opening timing parameter indicative of the opening timing of the exhaust valve;
   basic amount-calculating means for calculating a basic amount of a pumping loss of the engine based on the acquired intake pressure and exhaust pressure;
   exhaust gas sweep-out loss-calculating means for calculating a pumping loss of the pumping loss of the engine, which varies with a change in the opening timing of the exhaust valve, as an exhaust gas sweep-out loss, based on the estimated in-cylinder gas amount and the detected exhaust valve opening timing parameter; and
   pumping loss-calculating means for calculating the pumping loss of the engine based on the calculated basic amount and the calculated exhaust gas sweep-out loss.

2. The pumping loss calculation device according to claim 1, further comprising engine speed-detecting means for detecting an engine speed, and
   wherein said basic amount-calculating means calculates, further based on the detected engine speed, the basic amount of the pumping loss such that the basic amount of the pumping loss becomes a larger value as the engine speed is larger, and
   wherein said exhaust gas sweep-out loss-calculating means calculates, further based on the engine speed, the pumping loss of the engine.

3. The pumping loss calculation device according to claim 1, wherein the engine includes a supercharger for supercharging intake air, and is configured to have a valve overlap period during which the intake valve and the exhaust valve are simultaneously open,
   the pumping loss calculation device further comprising:
   intake valve opening timing parameter-detecting means for detecting an intake valve opening timing parameter indicative of opening timing of the intake valve, and exhaust valve closing timing parameter-detecting means for detecting an exhaust valve closing timing parameter indicative of closing timing of the exhaust valve, wherein said in-cylinder gas amount-estimating means estimates the in-cylinder gas amount based on the intake pressure, the detected intake valve opening timing parameter, and the detected exhaust valve closing timing parameter.

4. The pumping loss calculation device according to claim 2, wherein the engine includes a supercharger for supercharging intake air, and is configured to have a valve overlap period during which the intake valve and the exhaust valve are simultaneously open, the pumping loss calculation device further comprising:

intake valve opening timing parameter-detecting means for detecting an intake valve opening timing parameter indicative of opening timing of the intake valve, and exhaust valve closing timing parameter-detecting means for detecting an exhaust valve closing timing parameter indicative of closing timing of the exhaust valve, wherein said in-cylinder gas amount-estimating means estimates the in-cylinder gas amount based on the intake pressure, the detected intake valve opening timing parameter, and the detected exhaust valve closing timing parameter.

* * * * *